United States Patent

Camosso

[15] 3,657,781
[45] Apr. 25, 1972

[54] METHOD FOR THE MANUFACTURE OF ROLLING BEARINGS

[72] Inventor: Domenico Camosso, Turin, Italy

[73] Assignee: RIV-SKF Officine di Villar Perosa S.p.A., Turin, Italy

[22] Filed: Nov. 20, 1970

[21] Appl. No.: 91,244

[30] Foreign Application Priority Data

Nov. 20, 1969 Italy.................................54,114 A/69

[52] U.S. Cl. ........................................29/148.4 A, 29/434
[51] Int. Cl. .....................................B23p 11/00, B23p 19/00
[58] Field of Search.......................29/148.4 A, 434, 148.4 R

[56] References Cited

UNITED STATES PATENTS 2,719,765 10/1955 Menne..............................29/148.4 A
2,783,528 3/1957 Menne..............................29/148.4 A Primary Examiner—Thomas H. Eager
Attorney—Young & Thompson

[57] ABSTRACT

Rolling bearings are formed by disposing a crown of rolling bodies such as balls in contact with each other between a pair of concentric cylindrical deformable metal tubes, and then deforming the tubes toward each other on axially opposite sides of the balls by simultaneously exerting on the sleeves pressures directed toward the balls, thus utilizing the balls as forming elements for generating rolling tracks for the balls on the races provided by the sleeves. The sleeves are rotated relative to each other during this deformation by contoured forming rollers applied to the inner and outer surfaces of the inner and outer races, respectively.

5 Claims, 7 Drawing Figures

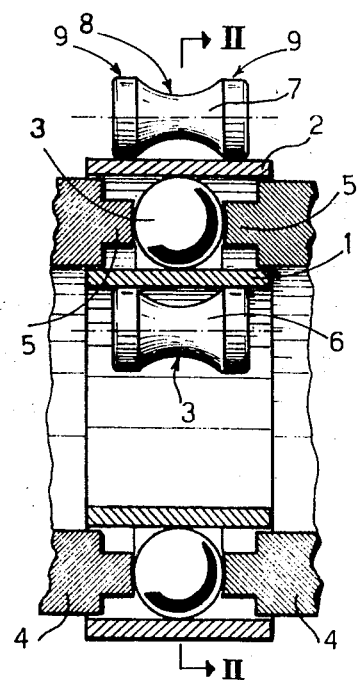
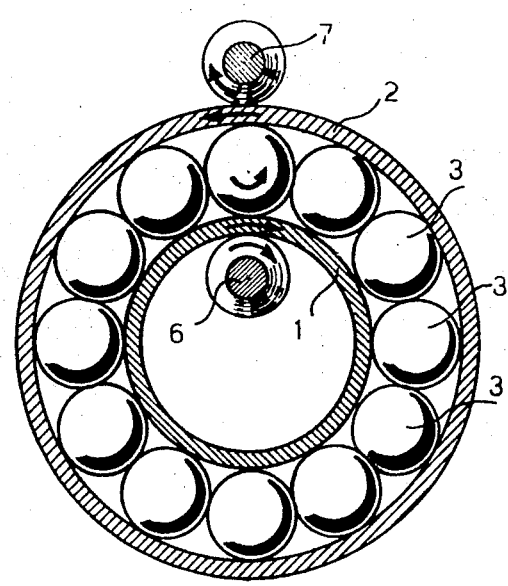
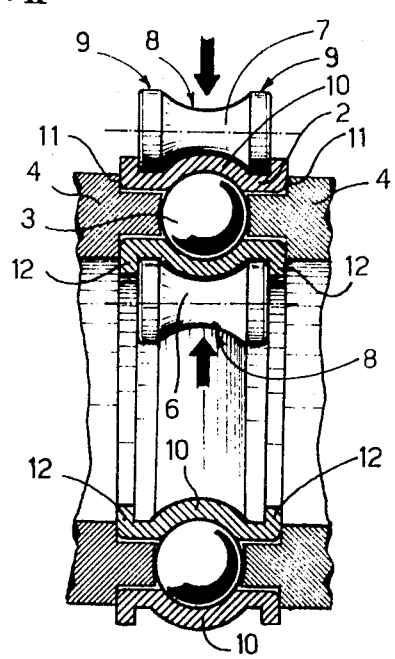
Fig. 1
Fig. 2
Fig. 3
INVENTOR
DOMENICO CAMOSSO

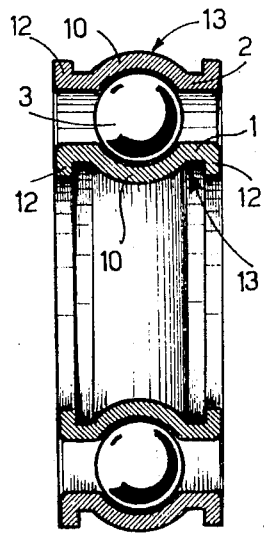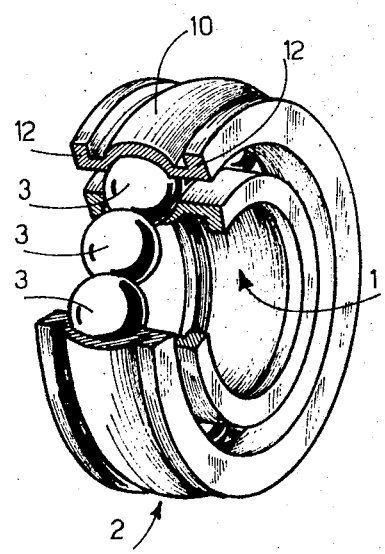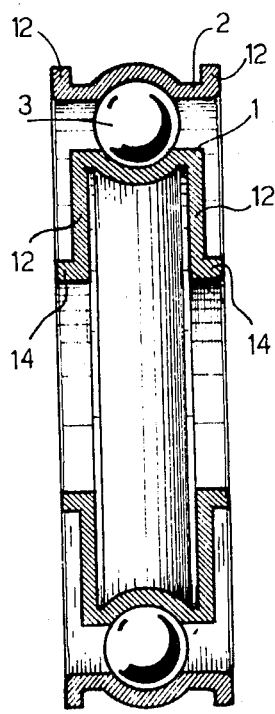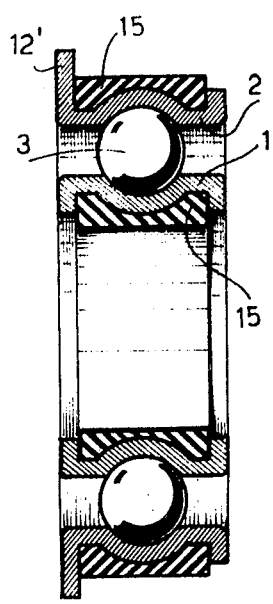

METHOD FOR THE MANUFACTURE OF ROLLING BEARINGS

This invention relates to a method for the manufacture of rolling bearings and, more particularly, to a process which produces bearings wherein the number of revolving bodies (balls or rollers) can be so high as to completely fill the annular space comprised between the inner and the outer race and wherein these races are obtained from tubular members by plastic deformation. The bearings obtained by the method in accordance with the present invention have a high capacity of load, both axial and radial (due to the provision of a great number of revolving bodies), are very light and of low cost.

In the manufacture of rolling bearings, as is well known, the inner and the outer race of the bearing are produced separately by machining with removal of shavings or by other procedures, revolving between these races are subsequently mounted the revolving bodies, by introducing the latter laterally into the hollow space resulting upon disposing one of said races somewhat eccentrically or offset relative to the other. The number of revolving bodies which can be introduced in this manner is obviously not that corresponding to the condition of the so-called "complete filling" (wherein the annular space comprised between the two races of the bearing is completely occupied by said bodies and these are in contact with one another), the number of revoling bodies introduced being of course only that whose introduction is permitted by the aforementioned eccentricity of the races.

Since the load capacity of a bearing depends upon the number of revolving bodies with which it is provided and among which the load applied to the bearing is distributed, a number of constructional solutions have been proposed in order to permit the introduction of a number of revolving bodies higher than that permissible in the bearings of the kind described.

A first solution to this problem consists in providing in the races a pair of notches or slots of such size as to permit, when they are aligned along one and the same radius, the introduction of each revolving body. In the bearings manufactured by this process, even though the load capacity for the radial loads is increased, the axial load capacity is certainly reduced to a considerable degree, due to the provision of the aforementioned slots which create discontinuities on the side portions of the tracks of the bearing races.

According to another constructional design, the introduction of the revolving bodies takes place, instead of through said slots, through a radial hole provided in one of the races. In this instance, as compared with the preceding case, the capacity of axial load is considerably improved, whereas the capacity for radial loads is reduced. Moreover, the closure of the aforementioned hole requires delicate adjusting or trimming operations, which render the manufacture of the bearing rather difficult and add to its cost of production.

Still another constructional solution consists in manufacturing one or both the races or rings of the bearing in two separate parts. Even if the radial and axial load capacity of the bearing thus obtained is good, its assembling will however require locking members adapted to hold fixed, one relative to the other, the two half-rings into which at least one of the races of the bearing has been subdivided. Further, the machining of the tracks (or rolling seats) of such bearings requires particular care and accuracy, and therefore their cost is rather high.

Still another process consists in preparing one of the two races in the usual shape and with the normal machining operations, but of dimensions different from those assumed by the race in question in the finished bearing. If the race thus prepared is the inner ring, its diameter will be smaller than the final one, whereas the reverse applies when the race in question is the outer ring. On account of the annular space of large dimensions defined between the two races of the bearing, it is possible to introduce a large number of revolving bodies therebetween. Subsequently the ring, whose dimensions are different from the final size, is plastically deformed by rolling, broaching, drawing or the like, so as to impart the desired final dimensions thereto. However, this process has proved to be rather time-consuming and costly because—besides requiring the preparation, with conventional techniques, of fully finished rings but of dimensions different from the final size—it subsequently requires an additional operation (plastic deformation) in order to impart the desired final dimensions to at least one of the rings.

Finally, according to another procedure, the two races of the bearing are constructed still separately, either by removal of shavings or with operations of plastic deformation such as rolling, deep drawing or the like, carried out on semifinished products of suitable shape. In this instance, to the rings is normally imparted a shape such as to permit assembling and disassembling of the bearing by relative axial movement of one ring or race with respect to the other. Obviously, such bearings are adapted to support axial loads directed in one direction only.

In accordance with the present invention, there is provided a method for the manufacture of rolling bearings, wherein the number of revolving bodies can be so high as to completely fill the annular space comprised between the inner and the outer race ("complete filling"). This invention also relates to the bearings obtained by said process, which have a good capacity of load both radial and axial, besides being lightweight and of low cost.

The process in accordance with the invention is characterized by the plastic deformation of two tubular members between which a crown of revolving bodies has been disposed, by simultaneously exerting, upon each of these tubular members, pressures directed towards said bodies, and by utilizing the latter as forming elements for generating rolling tracks for the revolving bodies on said annular members.

For a better understanding of the present invention, one preferred embodiment thereof will now be described, merely by way of non-limiting example, as well as the various process steps and some particular forms of the bearings obtained thereby, with reference to the accompanying drawings, wherein:

FIG. 1 is a vertical section of the basic elements for the construction of a bearing with the process of the invention, mounted on a fixture and during the first process step;

FIG. 2 is a section of the elements of the bearing and the fixture of FIG. 1, along the line II—II of FIG. 1;

FIG. 3 is a section corresponding to that of FIG. 1, illustrating the final step of the process of the invention;

FIG. 4 is a vertical section of a ball bearing obtained with the process of the invention;

FIG. 5 is a perspective view of the bearing shown in FIG. 4;

FIG. 6 shows a second embodiment of ball bearing obtained with the process of the invention;

FIG. 7 is a vertical section of a third embodiment of a ball bearing obtained by the process of the invention and provided with rubber rings.

Referring now to FIG. 1, which illustrates the initial step of the process in accordance with the invention utilized for the construction of a ball bearing, two tubular members or inner and outer races, 1 and 2 respectively, are initially prepared, between which the balls 3, forming a crown of revolving bodies, are disposed. The outside diameter of the race 1 and the inside diameter of the race 2 are such as to permit insertion of the balls 3 in the annular space defined thereby. Suitably, but not necessarily, the number of these balls 3 is such as to completely fill said annular space ("complete filling").

Subsequently, the assembly comprising the inner race 1, the outer race 2 and the balls 3 is mounted on a fixture substantially comprising a pair of support rings 4. Each of these rings 4 is provided with a ring-shaped projection 5, whose front surface is adapted to coact with that of the balls 3; preferably, the shape of this surface is such as to originate, in a section made with a diametral plane, an arc of circle whose radius is slightly greater than that of the ball 3. In this manner, the contact area between the ball and the front surface of the ring-shaped projections 5 is small and substantially lies on a horizontal axis passing through the center of each ball.

Upon completion of the assembling operation of said assembly on the support rings 4 in the manner described above, two rollers—i.e., an inner and an outer roller, 6 and 7 respectively—are pushed radially and with adequate pressures against the races 1 and 2, in the directions indicated by the arrows in FIG. 3. As shown in FIG. 1, these rollers have—in the case of the example illustrated in the drawings—a profile comprising a curved central section 8 and a pair of straight side portions 9. One of the two rollers, for instance the inner roller 6, is entrained in rotation by suitable means, not shown.

During the rotational movement of the inner roller 6, as indicated by the arrows in FIG. 2, the inner race 1 is entrained in rotation and, in turn, causes the balls 3 to revolve substantially around a horizontal axis passing through the center thereof. The balls 3 will then cause the outer race 2 to rotate, with consequent rotation of the outer roller 7. Therefore, to a rotation of the inner race 1, generated by the roller 6, a rotation of the outer race 2 in the opposite direction will correspond, like an epicyclic train whose sun wheel and crown gear are constituted by the inner race 1 and the outer race 2, respectively, the planetary gears by the balls 3 and the train-holder—which is stationary in the case of the example illustrated—by the support rings 4.

According to a different embodiment, not shown means can be provided for entraining the races 1 and 2 in rotation and for supporting the balls 3, which means are different from those described above, For instance, the two rollers 6 and 7, which are both driving rollers, will still rotate in the direction of the arrows shown thereon, thereby entraining in rotation both the races 1, 2 and the balls 3, which will still rotate in the same directions shown in FIG. 2. In this instance, however, the balls 3—since they do not transmit any entrainment torque from the race 1 to the race 2—will be able to rotate about stationary axes, without any need of supporting them by means of rings of the kind of the support rings 4.

Under the action of the pressures exerted by the rollers 6 and 7 (FIG. 2), during rotation of the inner race 1 and the outer race 2, an actual rolling of the same will take place. In fact, to the forces applied by said rollers, equal and opposite reactions generated by the balls 3 will correspond and, therefore, each race will be gradually deformed, until it reaches the final profile desired, as shown in FIG. 3. It should be noted that, during this rolling operation, if the opposite forces applied by each roller 6 and 7 are equal (as generally is the case), the resultant force applied to the ball 3 disposed between said rollers will be null and, therefore, no action will be exerted on this ball tending to displace the same from its seat on the support rings 4.

In FIG. 3 can be seen, in section, the final shape attained by the races 1 and 2. In each of these races an annular groove 10 is provided, whose shape is fully corresponding to that of a groove in a bearing race machined with conventional operations. In fact, in the final step illustrated in FIG. 3, the central section 8 of the profile of each roller 6 and 7 will define, together with the balls 3, a hollow space substantially having, in section, the shape of an arc of a circular crown, inside which the material of each of the races 1 and 2 is received. At the same time, the straight side portions 9 of said profile and the shoulders 11 (FIG. 3) of the support rings 4 will plastically deform the side portions of the races 1 and 2, thereby forming the overturned side edges 12 in the finished bearing.

The mating ratio of the finished bearing i.e. the ratio of the radius of the balls 3 to the radius of the grooves 10, measured in a diametral plane of each race) will depend, for a given radius of the balls 3, on the radius of the central section 8 of the profile of the rollers 6 and 7, as well as on the elastic recovery of the material of the races 1 and 2 and the pressures exerted by the rollers 6 and 7 on said races.

By suitably choosing the values of these parameters, it will be possible to attain the same mating ratios as in the ball bearings of conventional construction.

In FIGS. 1, 2 and 3 are not shown the means provided for entraining the roller 6 in rotation, nor those serving for supporting the rollers 6 and 7 and for exerting, through the latter, the pressures on the races 1 and 2 as mentioned above. As a matter of fact, these means may be of any suitable kind and can be realized in various different manners. For instance, each roller could be provided with side pins, housed in supports mounted in any suitable manner. Further, the shape of the support rings 4 could be different from that shown in the drawings, provided that the revolution of each ball 3 is possible, in the manner described above.

The bearing obtained with the process of the invention herein described and illustrated in FIGS. 1, 2 and 3, is shown in section in FIG. 4 and in perspective view in FIG. 5. Owing to its manufacturing process, this bearing is provided with a crown of balls wherein the number of the balls is the maximum consistent with the condition of the so-called "complete filling" and has, therefore, a high capacity of load. This loading capacity is high not only in radial direction but in axial direction also, as contrasted with many constructions described in the prior art, wherein said "complete filling" was also attained. Due to the rolling action exerted by the balls of the crown on the corresponding tracks of the inner and the outer race, it is possible to obtain highly accurate tracks as well as a good surface finishing of the same. Moreover, the bearing is very light, although its races are provided with side edges 12 of dimensions and strength sufficient to permit axial locking and mounting thereof (on a shaft or in a housing) with any conventional method. Further, inside each race an annular space 13 is available, which can be suitably filled with an appropriate material, such as for instance plastic material or rubber, so as to obtain either a single continuous cylindrical surface or rings of elastic and insulating material, adapted for mounting of particular kinds. Finally, since the process is—as stated above—simple and rapid, the bearing obtained thereby is of low cost.

By slightly modifying, in a quite obvious manner, the dimensions of the races 1 and 2 (FIG. 1), as well as the shape of the profile of the rollers 6 and 7 and the support rings 4, it is possible to obtain, with the process in accordance with the invention, bearings of a shape slightly different from that shown in FIGS. 4 and 5, and adapted for particular applications.

FIG. 6 shows a bearing whose inner race 1 is provided with overturned side edges 12 of considerable height, and with a cylindrical support zone 14. This bearing is adapted for applications wherein, on account of the low radial loads applied to the bearing, it is sufficient to use a shaft of small diameter, while the component supported by said bearing has instead a rather large diameter. In this bearing, on account of the great diameter of the tracks and, therefore, of the high number of balls housed therein, it is possible to attain a high capacity of load even without any particular treatment of the material of the races.

FIG. 7 shows a bearing similar to that of FIGS. 4 and 5, wherein one of the overturned edges 12' is of greater height and whose annular spaces 13 have been filled with a suitable material 15, for instance rubber, by means of an additional operation. The edge 12' can be useful for axially locking, in a quite obvious manner, the outer race of the bearing on the corresponding housing. The rings 15 are provided with cylindrical surfaces whose diameter is slightly greater (outer ring) or slightly smaller (inner ring) than that of the corresponding races of the bearing to which they are fastened. With this constructional arrangement it is possible to resiliently mount the bearing either on a shaft or in a cylindrical seat. This kind of mounting, which is of widespread use in some applications of lesser importance, is also adopted when it is desired to establish an electrical insulation between the shaft and the seat.

With the process of the invention described above it is also possible to obtain ball bearings whose inner and outer races have shapes different from those described, by simply changing the shape of the parts or components cooperating with with the races 1 and 2 (FIG. 1), during the aforementioned rolling step. Further, by utilizing rolling bodies other than balls, for instance cylindrical or barrel-shaped rollers, it is possible to obtain roller bearings. Moreover, by suitably modifying the profile of the central section 8 of the rollers 6 and 7, it is possible to obtain grooves 10 (FIG. 3), in which the abutment with the ball, instead of being limited to a central zone only, will take place on two annular zones which are symmetrical relative to a plane perpendicular to the axis of the bearing and passing through the center of the balls, as required when it is desired to increase the capacity of axial load in both directions and to obtain a low ratio between the axial and the radial play. Finally, the process of the invention can also be suitably applied when it is desired to obtain bearings with a number of balls less than that corresponding to the condition of "complete filling."

It will be apparent that many modifications and variations can be introduced in the process described as well as in the various elements and parts constituting the fixture utilized in said process, without departing from the scope of the invention. In particular, it is also possible to employ two or more pairs of rollers 6 and 7, instead of a single pair, or these rollers can perform a rotational movement about the axis of the races 1 and 2, besides the movement of revolution about their own axis.

The scope of the invention also comprises any process by which the two races 1 and 2 (between which a crown of revolving bodies has been disposed) are plastically deformed, by applying to said races pressures directed towards the revolving bodies. Therefore, this deformation could be attained in a manner different from that described above by providing, for instance, outside the race 1, a ring with an inner groove (in lieu of the roller 7) which, by coacting with the balls (or with the revolving bodies) will form the groove 10 in the race 2 by plastic deformation. It is also possible to use roller or forming tools of any kind, adapted to plastically deform the races 1 and 2, by cooperating with the revolving bodies, for generating the rolling tracks for said bodies.

Having described my invention, I claim:

1. Method for the manufacture of rolling bearings, comprising assembling two tubular members in concentric relation with a crown of rolling elements between them, and simultaneously exerting upon said tubular members pressures directed toward said elements and disposed at locations on each tubular member on opposite sides of said elements thereby to deform said tubular members toward each other to define races for said elements while using said elements as forming means for generating said races.

2. Method as claimed in claim 1, and causing said tubular members to have rotation relative to each other during said deforming.

3. Method as claimed in claim 1, in which said exertion of pressure is effected by applying contoured roller means to at least one of said tubular members.

4. Method as claimed in claim 1, and inserting annular support members between the ends of said tubular members on opposite sides of said elements to restrain said elements during said deformation.

5. Method as claimed in claim 1, and disposing said elements between said tubular members in such quantity that said elements touch each other substantially entirely about said crown.

* * * * *